Figure 1:
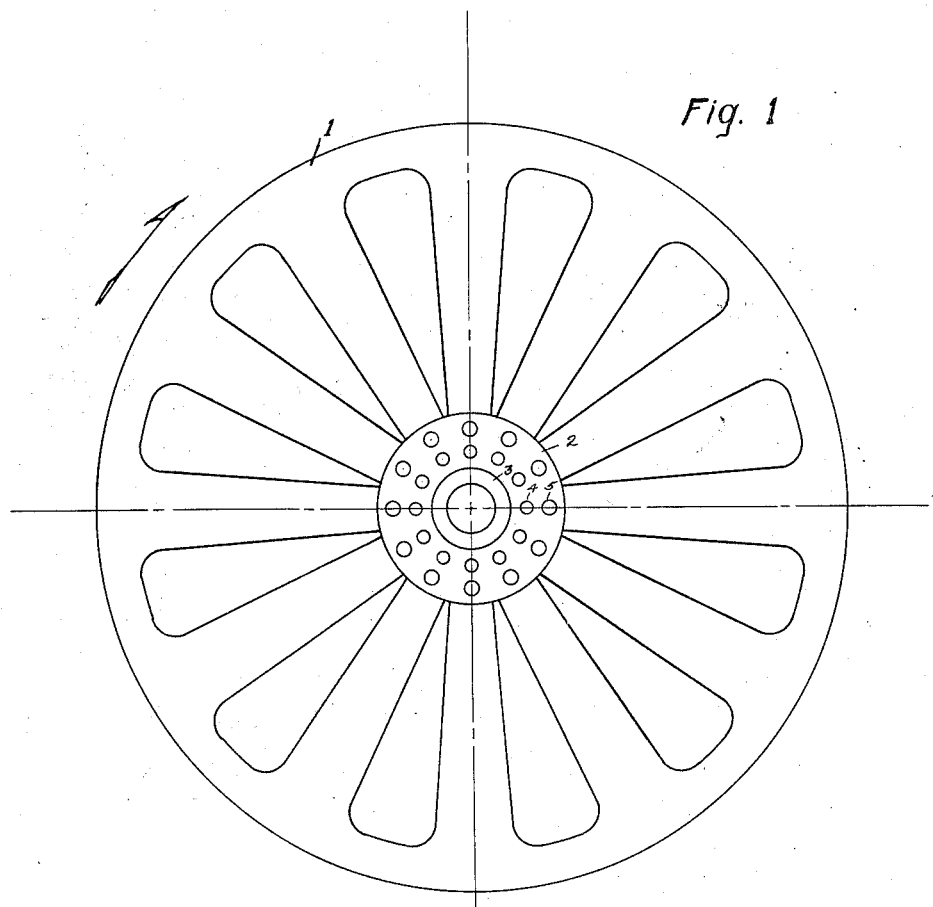

Aug. 28, 1934.  J. A. JACKSON  1,971,820
HELICOPTER AIRSCREW
Filed June 1, 1932  3 Sheets-Sheet 1

INVENTOR
Jesse A. Jackson

Aug. 28, 1934.　　　J. A. JACKSON　　　1,971,820
HELICOPTER AIRSCREW
Filed June 1, 1932　　　3 Sheets-Sheet 2
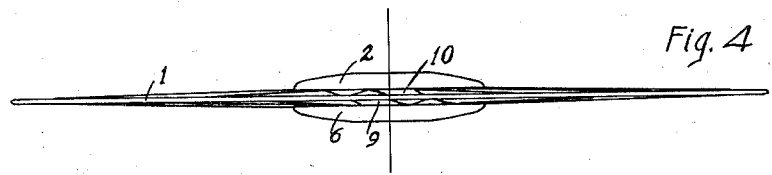
Fig. 4
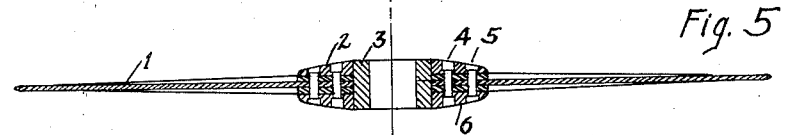
Fig. 5
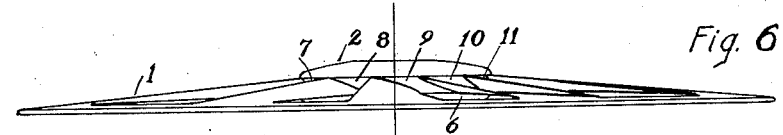
Fig. 6
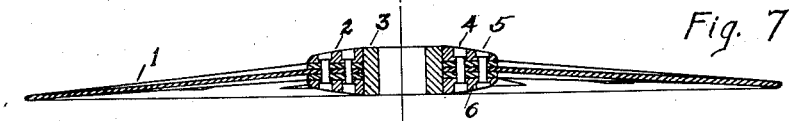
Fig. 7
Fig. 8
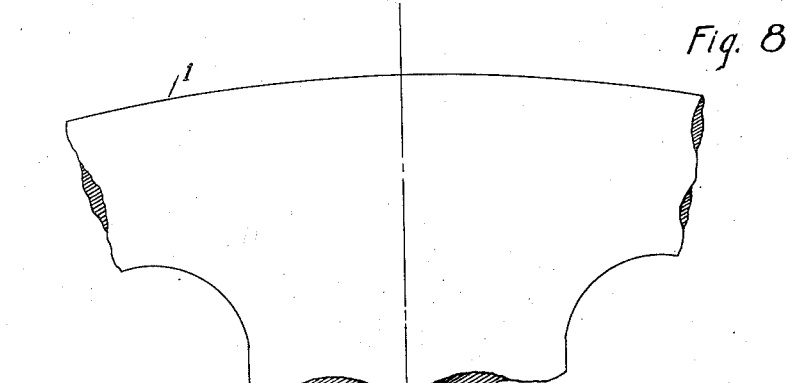
Fig. 9
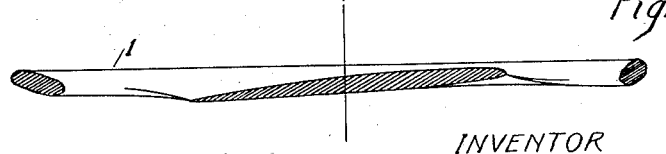
INVENTOR
Jesse Atwater Jackson Aug. 28, 1934.   J. A. JACKSON   1,971,820
HELICOPTER AIRSCREW
Filed June 1, 1932    3 Sheets-Sheet 3

INVENTOR
Jesse Atwater Jackson

Patented Aug. 28, 1934

1,971,820

UNITED STATES PATENT OFFICE 1,971,820

HELICOPTER AIRSCREW

Jesse Atwater Jackson, Lutherville, Md.

Application June 1, 1932, Serial No. 614,682

2 Claims. (Cl. 170—168)

The object of this invention is to provide a vertical lift for helicopters or other types of flying machines, either heavier-than-air or lighter-than-air craft, by means of an airscrew which has a rim of unique design and a novel disposition of rim and blades, and is therefore particularly designed for low drag against the forward motion of the aircraft, for high strength and rigidity against aerodynamic, centrifugal, and vibrational forces, and for ease and cheapness of manufacture. Its nature is such that it will find its best use when it is mounted in pairs having opposite pitches on vertical or nearly vertical shafts driven in opposite directions on opposite sides of the machine. It should be constructed mainly of rigid materials such as steel, aluminum, bakelite, phenol-fibre, or etc.

It is recognized that previous attempts have been made to fly with helicopters, i. e. with aircraft whose vertical lift is provided in whole or in part by airscrews revolving on vertical or near vertical shafts; however in the present state of the art of flying, the helicopter has been far outstripped by other types of aircraft whose vertical lift is provided by wings; due to the fact that previously used types of helicopter airscrews have not had sufficient lift, or have not been strong enough, or have imposed too great a drag against the forward motion, or have set up troublesome vibrations. Therefore the following improvements are incorporated in this invention: the airscrew is provided with a rim of thin section to give strength without greatly increasing the drag; the rim and blades may be made in one piece for greater strength and for ease and cheapness of manufacture; the blades and rim may be given a conical shape for greater rigidity; the inner ends may be incorporated in a hub of such shape that will have low air resistance against the forward motion of the aircraft, and of such diameter that the linear speed of a point on a blade where it joins the hub will not be less than the forward speed of the aircraft in relation to the wind.

For conditions of helicopter performance under which it might be desirable to use an airscrew with a large number of blades, the presence of the fixed rim in this invention would make it possible to use a larger number of blades than would be possible with other types, and the use of one of the conical shape variations of this invention would contribute to this effect, since in general the larger the number of blades the smaller their width and thickness must be in relation to their length, and therefore the greater the need of the strengthening rim and conical shape.

Figure 2:
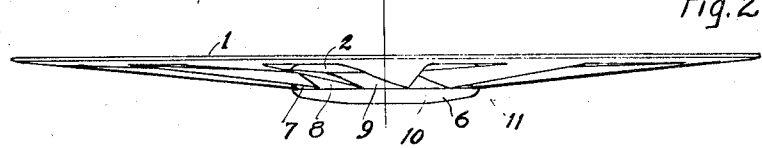
Figure 3:
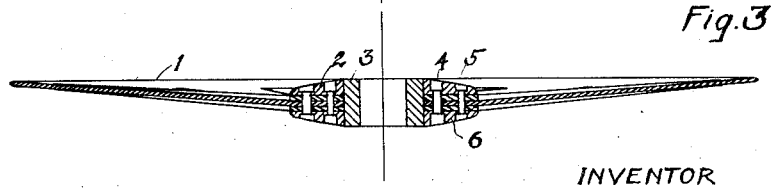
Figure 10:
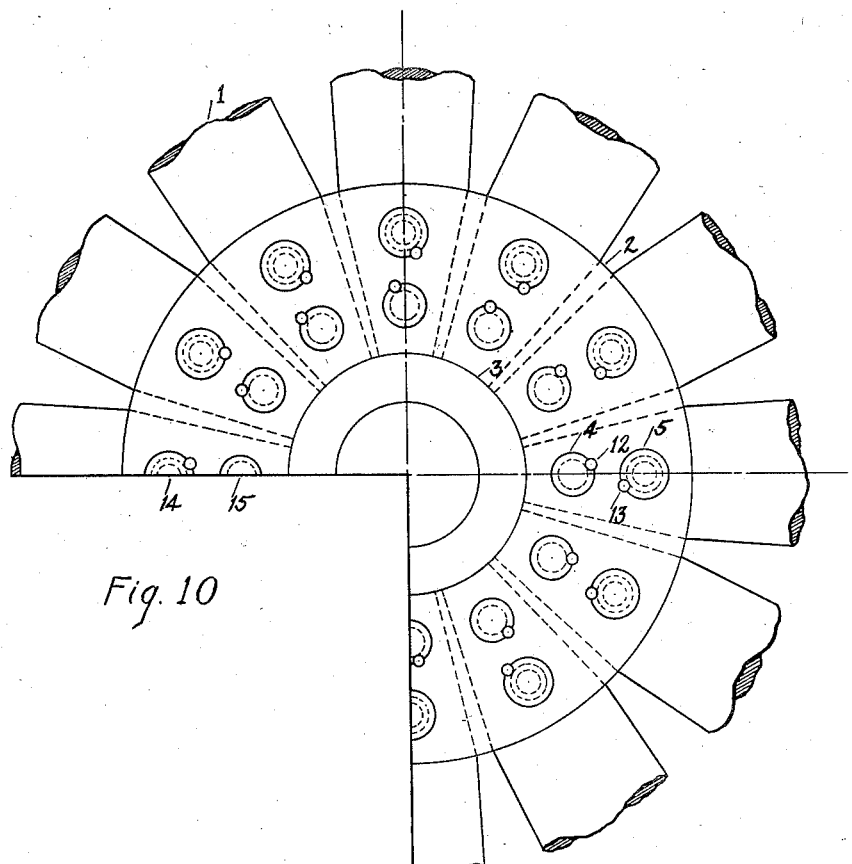
Figure 11:
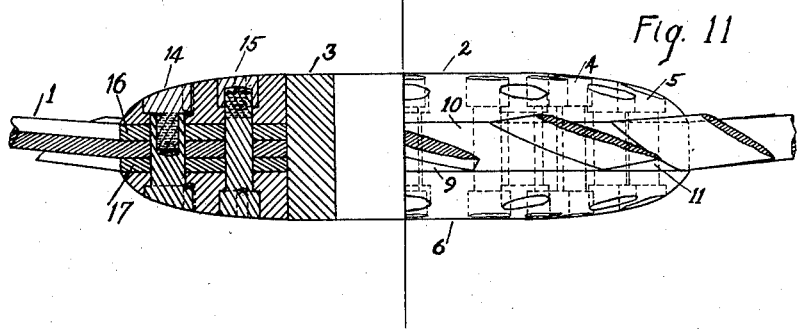

One form of the invention is shown in the accompanying drawings, with three variations of this form illustrated by comparison of Figures 2, 4 and 6. Figure 1 is a plan view, which can be taken as the same for each of the three variations mentioned. Figure 2 is a side view of the first variation in which the plane of the outer edge of the rim is slightly above the middle of the hub. Figure 3 is a sectional view of Figure 2 taken as if cut by the plane of the paper. Figure 4 is a side view of the second variation in which the middle of the hub lies in the plane of the rim. Figure 5 is a sectional view of Figure 4. Figure 6 is a side view of the third variation, in which the plane of the outer edge of the rim lies below the middle of the hub. Figure 7 is a sectional view of Figure 6. Figure 8 is an enlarged view of a portion of the rim and the end of a blade as seen from above. Figure 9 is a side view of Figure 8. Figure 10 is an enlarged plan view of the hub, with a quarter section cut out for purposes of illustration. Figure 11 is a side view of Figure 10.

Of the three variations, the first and third, shown respectively in Figures 2 and 6 will have greater structural rigidity due to their conical shape; i. e. the center-lines of the blades lie as elements of a cone whose point lies in the center-line of the hub, and whose base is the plane of the outer edge of the rim. The second variation, shown in Figure 4, can be used where the conditions of use, and the thickness of the blades and rim are such that it will have the inherent strength and rigidity required.

The presence of the rim makes it possible to use in this invention blades of a very thin section, which combined with a proper adjustment of the variable factors of design such as rotating speed, pitch of blades, outside diameter, diameter of hub, to the weight of the aircraft and its cruising speed will give an efficient vertical lift for all requirements of climbing, cruising, hovering, and landing.

The blades and rim 1 may be made in one piece with all exposed edges faired and rounded so as to give the least possible drag against the air, and with all parts as thin as possible consistent with the strength and rigidity required. The pitch of the blades at any particular distance from the center, and its variation along the length of the blades will be determined by a consideration of the weight of the aircraft, its speed, and the power of its motors, in accordance with known principles of airscrew design. The section of the blades should be that of an airfoil, but its dimensions such as length of chord, thickness, position of maximum ordinate, etc., will be set also in accordance with known principles of airscrew design. In the example shown, the length of chord is increased slightly from the hub outward, the length of the maximum ordinate is held constant, and the position of the maximum ordinate is considered to remain at a constant percentage of the length of chord. Figures 8 and 9 show clearly how the blade, if desired, may be given a slight pitch at a point very close to the rim itself. It should be noted that the number of blades is optional. If the blades and rim are not made solid their joints should be closely fitted without cracks or corners and the whole should be faired or smoothed to keep down wind resistance.

The optimum dimensions for any particular example of this invention, and the choice of which of the three variations (Figures 2, 4, and 6) should be used, can be determined by any person skilled in the art of airscrew design.

For the type of hub illustrated, the main parts are the upper and lower plates 2 and 6, and the central bushing 3. Plates 2 and 6 may be fastened to the bushing 3 by welding, by screw threads, by serrated keyways, by tap screws, by taper pins, or by any other means or any combination of means. The inner ends of the blades fit between blocks as at 7, 8, 9, 10, 11, 16, 17, which are clamped between plates 2 and 6, and the whole held firmly in place by the plugs or bolts 4, 5, 14, 15. These plugs or bolts 4, 5, 14, 15, after being screwed firmly in place, are pinned as at 12 and 13, and after the protruding corners of the heads of the plugs or bolts 4, 5, 14, 15 have been ground off flush, the pins 12, 13 are countersunk and spot-welded to keep them in place permanently. The inner diameter of the bushing 3 can be key-slotted as desired for the shaft.

For an example of a possible application of this invention let us consider a helicopter which is to travel at 150 M. P. H., whose helicopter airscrews would have hubs 12 inches in diameter and would revolve at 4500 R. P. M. Now the helicopter airscrews revolve in a nearly horizontal plane and travel in that plane so that on one side of the shaft the blades move forward and on the other side rearward. With a relative wind of 150 M. P. H., the revolutions per minute should be high enough to prevent a negative lift at the inner ends of the blades on the side of the shaft at which the blades move rearward. At 4500 R. P. M. a point on a blade at the hub would have a linear speed of 161 M. P. H. for a 12 inch hub, so that the lift is positive at all points about the shaft. Of course, points on a blade farther from the center would have even greater linear speed at the same revolutions per minute. We will consider 1000 feet per second as our limiting speed for the ends of the blades, as this is slightly under the speed of sound in air, although the tip sections of propellers on modern aircraft engines often approach and in some cases exceed the velocity of sound. With this, however, as a limit we will find that we can employ blades with tips which join the rim at 25 inches from the center of the hub. This length for a large number of blades of high lifting efficiency due to their thin section will give more than sufficient total lift for the purposes of flight. If more lifting area were desired, the hub diameter could be increased to 14 in., the outside tip radius increased to 36 inches, and the rotating speed reduced to 3280 R. P. M. without exceeding the velocity of sound or acquiring a negative lift.

I am aware that prior to my invention, airscrews or propellers have been used which rotate in a horizontal or near horizontal plane to provide a vertical lift for an aircraft. I therefore do not claim such an invention broadly, but I claim:

1. A helicopter airscrew comprising, in combination, a hub having a greater diameter than axial dimension and being uniformly tapered from its central part to its periphery which latter is rounded in the axial planes and in the planes that cross its axis, and an integral unit consisting of a rim and a series of blades which latter have their inner ends rigidly united with the hub's rounded periphery in a proper manner to form a streamlined connection while the outer ends of blades are rigidly united with the rim and substantially flush therewith at their upper and lower sides, the width of said rim along diametral lines being much greater than the thickness thereof along axially parallel lines, the pitch-angle of each blade being gradually increased from nil at the rim to a slight incline at the hub, substantially as shown, for the purposes specified.

2. A helicopter airscrew comprising, in combination, a hub having a greater diameter than axial dimension and having its periphery rounded in the axial planes to produce a streamlined effect, said hub having an annular channel in its rounded periphery, and an integral unit consisting of a series of thin blades and a relatively wide and thin rim all of substantially equal thinness, said rim lying substantially in a common plane with the outer ends of the blades and having its upper and lower sides flush with those of the blades, the inner ends of the blades being secured in said annular channel, and spacing blocks respectively between adjacent inner ends of the blades in proper relation to hold them at a slight inclination to said common plane, means being provided to hold the said inner ends of the blades and the spacing blocks secure and fixed in said annular channel.

JESSE ATWATER JACKSON.